United States Patent [19]

Maier

[11] 3,968,131
[45] July 6, 1976

[54] MANUFACTURE OF 1-AMINO-2-ALKOXY-4-HYDROXYANTHRAQUINONES

[75] Inventor: Karl Maier, Ludwigshafen, Germany

[73] Assignee: BASF Aktiengesellschaft, Ludwigshafen (Rhine), Germany

[22] Filed: Jan. 31, 1975

[21] Appl. No.: 545,840

[30] Foreign Application Priority Data
Feb. 7, 1974 Germany.......................2405782

[52] U.S. Cl............................. 260/380; 260/383
[51] Int. Cl.²........................................ C07C 97/26
[58] Field of Search........................... 260/380, 383

[56] References Cited
UNITED STATES PATENTS

| | | | |
|---|---|---|---|
| 2,844,598 | 7/1958 | Günthard............................ | 260/380 |
| 3,530,150 | 9/1970 | Rickenbacher..................... | 260/380 |
| 3,557,155 | 1/1971 | Yamada............................. | 260/383 |
| 3,642,835 | 2/1972 | Hederich et. al.................... | 260/380 |
| 3,704,252 | 11/1972 | Bien et. al........................... | 260/380 |
| 3,779,700 | 12/1973 | Wegner et al....................... | 260/380 |

*Primary Examiner*—Arthur P. Demers
*Attorney, Agent, or Firm*—Johnston, Keil, Thompson & Shurtleff

[57] ABSTRACT

An improvement in the process for the manufacture of 1-amino-2-alkoxy-4-hydroxyanthraquinones by reaction of primary, saturated, linear or branched aliphatic alcohols, which may contain further substituents, with 1-amino-2-phenoxy-4-hydroxyanthraquinone or 1-amino-2-methoxy-4-hydroxyanthraquinone in the presence of alkaline reagents, which consists in carrying out the reaction in the presence of polyethylene glycols of molecular weight above 150. The presence of the polyethylene glycol facilitates the reaction and as a result high yields of reaction product are obtained even with alcohols which react incompletely, if at all, in prior processes.

10 Claims, No Drawings

MANUFACTURE OF 1-AMINO-2-ALKOXY-4-HYDROXYANTHRAQUINONES

The invention relates to a process for the manufacture of 1-amino-2-alkoxy-4-hydroxyanthraquinones.

1-amino-2-alkoxy-4-hydroxyanthraquinones are valuable red to pink dyes which are used for dyeing synthetic fibers, above all polyester fibers, and for mass coloring synthetic polymers.

The 2-alkoxyanthraquinone derivatives are obtained by reaction of 1-amino-2-phenoxy-4-hydroxyanthraquinone or 1-amino-2-methoxy-4-hydroxyanthraquinone with primary alcohols in the presence of alkaline reagents (German Patent No. 1,209,680). According to the same patent specification, the same 2-alkoxyanthraquinone derivatives can be obtained directly from 1-amino-2-chloro-4-hydroxyanthraquinone or 1-amino-2-bromo-4-hydroxyanthraquinone and primary alcohols by carrying out the reaction with the alcohols in the presence of phenol and the alkaline reagent.

The rate of these reactions depends above all on the alcohol used. With a number of alcohols, complete conversion of the 2-phenoxy, 2-halogen or 2-methoxy compounds is only achieved after a very long reaction time, or the reaction does not go to completion at all. Since a part of the reaction product decomposes on prolonged heating, the product obtained in many cases is not pure and accordingly has to be purified before use as a dye.

It is an object of the present invention to provide a process for the manufacture of 1-amino-2-alkoxy-4-hydroxyanthraquinones, wherein 2-phenoxy-1-amino-4-hydroxyanthraquinone or 2-methoxy-1-amino-4-hydroxyanthraquinone can be reacted, to give pure dyes, even with alcohols which under the conditions known from the art react very slowly, if at all.

I have found that pure 1-amino-2-alkoxy-4-hydroxyanthraquinones can be obtained by reaction of the corresponding 2-phenoxy or 2-methoxy compounds of 1-amino-4-hydroxyanthraquinone with primary alcohols, in high yield and with short reaction times, if the reaction is carried out in the presence of polyethylene glycols of molecular weight not less than 150.

The addition of polyethylene glycols shortens the reaction times of the process of the invention, in general to from 70 to 20% of the reaction time when the process is carried out without added polyethylene glycol. In reactions which take place rapidly even under conventional conditions, the acceleration of the reaction is less than in reactions which take place very slowly, or incompletely, under normal conditions. Thus, for example, the reaction time of the industrially important reaction of 1-amino-2-phenoxy-4-hydroxyanthraquinone with 1,6-hexanediol to give the 2-(ω-hydroxyhexoxy)-anthraquinone derivative is lowered, by addition of polyethylene glycols, to from about 20 to 30% of the reaction time without polyethylene glycol.

The addition of polyethylene glycols, hereafter also referred to as polyglycols, also makes it possible to react 1-amino-2-phenoxy-4-hydroxyanthraquinone or 1-amino-2-methoxy-4-hydroxyanthraquinone with primary aliphatic alcohols or phenylaliphatic primary alcohols, which normally react sluggishly. The pure dyes are obtained in high yield and conversion is virtually quantitative.

In general, the process of the invention is carried out by adding the polyglycol to the mixture containing the 1-amino-2-phenoxy-4-hydroxyanthraquinone or 1-amino-2-methoxy-4-hydroxyanthraquinone, the primary alcohol, the alkaline reagent and, if desired, an added solvent which is inert under the reaction conditions, and carrying out the reaction at the desired temperature, or by introducing the anthraquinone derivative into the mixture of the other components.

The polyethylene glycols which can be used for the process of the invention have molecular weights of 150, or above preferably 200. The molecular weight does not greatly influence the reaction rate; eg., a polyglycol of molecular weight about 10,000 has the same favorable effect on the reaction as a polyglycol of molecular weight about 200 or 1,000. Examples of suitable polyethylene glycols for the process of the invention are triethylene glycol, tetraethylene glycol, polyglycols with an average of from 5 to 9 ethylene oxide units of average molecular weight from 150 to about 400 and polyglycols of average molecular weight from 400 to about 10,000.

Further examples of polyglycols which can be used are those commercially available under the tradenames LUTROL and PLURIOL E, eg. PLURIOL E 200 to E 9,000. As a rule, the substances are mixtures of polyglycols.

The amount of polyglycol in the reaction mixture is, as a rule, from 10 to 25 per cent by weight, preferably from 15 to 20 per cent by weight, based on the anthraquinone compound to be reacted. Based on the primary alcohol used, the amount is generally from about 2 to 5 per cent by weight.

The rate of reaction of the 1-amino-2-methoxy-4-hydroxyanthraquinone or 1-amino-2-phenoxy-4-hydroxyanthraquinone with the alcohol depends greatly on the temperature and on the alcohol used. As a rule, the reaction in the presence of polyglycols is carried out at from 100° to 180°C, preferably from 110° to 160°C. At these temperatures, the reaction is, in general, complete after from 2 to 12 hours. The reaction wil also take place at temperatures as low as 80°C, but the reaction time must be extended greatly to achieve quantitative conversion. The reaction can also be carried out at temperatures above 180°C. In that case the reaction takes place very rapidly, but by-products are formed and these interfere with the use of the products as dyes, since the tinctorial properties of dyeings obtained with such products are adversely affected by the impurities.

Alcohols which can be used for the process of the invention are saturated linear or branched primary alcohols, especially of 1 to 20 carbon atoms, in which the alkyl radical can be substituted by other groups, eg. primary or secondary hydroxyl groups, alkoxy, carboxylic acid amide, nitrile or phenyl groups or other groups inert under the reaction conditions. Alcohols which boil below the reaction temperature are reacted under pressure.

The following are individual examples of primary saturated linear or branched aliphatic alcohols of 1 to 20 carbon atoms: methanol, ethanol, propanol, 1-butanol, amyl alcohol, 1-hexanol, 1-heptanol, 1-octanol, 1-nonanol, decyl alcohol, lauryl alcohol (dodecyl alcohol), stearyl alcohol, palmityl alcohol, 2-ethyl-1-hexanol, ethylene glycol, 1,2-propanediol, 1,3-propanediol, 1,3-butanediol, 1,4-butanediol, 3-methyl-1,3-butanediol, 1,5-pentanediol, 3-methyl-1,5-pentanediol, 1,6-hexanediol, 1,8-octanediol, 1,10-decanediol, neopentyl glycol, 2-methyl-2-ethyl-1,3-propanediol, 2-methyl-2-propyl-1,3-propanediol, 2,2-diethyl-1,3-propanediol, 2-ethyl-2-butyl-1,3-propanediol, 2,2,4-trimethyl-1,5-pentanediol, 2,2-dimethyl-1,3-hexanediol, 1,4-dimethylolcyclohexane, 1,1-dimethylolcyclohexane, trimethylolethane, trimethylolpropane, benzyl alcohol, 2-phenylethanol, 2-phenylpropanol, 3-phenylbutanol, 2-(4'-methylphenyl)-propanol, 2,3-diphenyl-1-propanol, 2-phenylbutanol, 2,4-diphenyl-1-pentanol, 5,5-diphenyl-2-methyl-1-pentanol, 4,4-diphenyl-2-ethyl-1-butanol, 4-methoxy-1-butanol, 5-methoxy-1-pentanol, 2,4-bisphenylpentanol, 2-phenylhexanol, phenoxyethanol, 6-methoxy-1-hexanol, 3-methoxy-2,2-dimethyl-1-propanol, 1,1-dimethylolindan, 4-cyano-1-butanol, 5-cyano-1-pentanol, 6-cyano-1-hexanol, ω-hydroxycaproic acid N-butylamide, ω-hydroxycaproic acid N-isobutylamide, ω-hydroxycaproic acid morpholide, ω-hydroxycaproic acid N-ethylamide or mixtures of these alcohols.

The amount of alcohol in the reaction mixture is in general from two to four times the weight of the anthraquinone compound to be reacted. The reaction can, however, be carried out in a large excess of primary alcohol, which then serves as the solvent. In such cases sufficient primary alcohol is used to allow the reaction mixture to be stirred before, during and after the reaction. For this purpose the amount of primary alcohol is in general from 3 to 10 times, preferably from 3 to 5 times, the amount of anthraquinone compound to be reacted. The reaction can also be carried out in an inert solvent in which case some of the primary alcohol can be saved. Under these circumstances, from 2 to 4 times the amount by weight of primary alcohol, based on anthraquinone derivative, in general suffices. Preferred solvents are polar aprotic solvents, such as N-methylpyrrolidone, N,N-dimethylformamide, dimethylsulfoxide, dimethylsulfone, tetramethylurea, hexamethylphosphoric acid triamide, N,N-dimethylacetamide, N,N-dimethylpropionic acid amide and their mixtures.

After completion of the reaction, the reaction mixture is worked up by conventional methods, eg. by dilution with lower aliphatic alcohols, such as ethanol, propanol or, preferably, methanol, which precipitates the product. Where the reaction products are more readily soluble in the organic medium, they are precipitated by adding water, or mixtures of water and alcohol, or acids. The precipitated dyestuff is then isolated by conventional methods.

Polyethylene glycol which may have been left with the dyes when isolating them can easily be removed from the dyes by washing with water.

Alkaline reagents which can be used for the reaction are alkali metal hydroxides, such as sodium hydroxide and potassium hydroxide, alkali metal carbonates, such as sodium bicarbonate and potassium bicarbonate, sodium carbonate and potassium carbonate, and mixtures of these compounds. Amongst the foregoing, potassium hydroxide and above all potassium bicarbonate and potassium carbonate are particularly preferred.

The amount of the alkaline reagent is in general from 0.8 to 2, preferably from 1.1 to 1.5, equivalents per mole of the 2-phenoxyanthraquinone or 2-methoxyanthraquinone compound.

The process of the invention can also be carried out by using the 2-bromoanthraquinone or, preferably, the 2-chloroanthraquinone compound instead of the 2-phenoxy or 2-methoxy compound and carrying out the reaction with the primary alcohol in the presence of about from 0.5 to 1.5 moles of a phenol per mole of the 1-amino-2-halo-4-hydroxyanthraquinone compound. In that case, at least 1 equivalent of the alkaline reagent is required per mole of the 2-haloanthraquinone, and it is advantageous to use from 1.1 to 1.5 equivalents. The phenol used is above all the unsubstituted parent substance, namely phenol itself, but o-, m- and p-cresol, the xylenols, p-chlorophenol and their mixtures are also suitable. The reaction with the 2-haloanthraquinone compound is preferably carried out in the presence of the aprotic polar solvents mentioned above. N-Methylpyrrolidone is particularly preferred since its use results in particularly pure dyes and high yields. In other respects, what has been said regarding the reaction of the 2-methoxy or 2-phenoxy compounds also applies to the reaction of the 2-halogenoanthraquinone compounds in the presence of phenols.

In the process of the invention a smooth reaction takes place in many cases at temperatures as low as from 110° to 120°C, with alcohols which in the conventional process only react smoothly at temperatures above 140°C. Alcohols which in the conventional process react very slowly, if at all, can be reacted with high space-time yields at temperatures of up to 180°C, in most cases of from 140° to 160°C, and give pure dyes.

The process of the invention is explained in more detail by the Examples which follow. Parts and percentages are by weight.

EXAMPLE 1 a. 25 parts of 1-amino-4-hydroxy-2-phenoxyanthraquinone are introduced into a mixture of 90 parts of 1-octanol, 4 parts of dry potassium carbonate and 5 parts of a polyethylene glycol of average molecular weight 800 at 125°C. After heating to 140°C for 13 hours under a nitrogen atmosphere, the phenoxy compound is found, by thin layer chromatography, to have been completely converted to the 2-octoxy compound. The mixture, at about 90°C, is diluted with 80 parts of methanol and after having cooled to room temperature the precipitate is filtered off and washed with methanol and water. Yield: 22.5 parts of 1-amino-4-hydroxy-2-octoxyanthraquinone.

b. The procedure described under (a) is followed but no polyethylene glycol is used. After 24 hours at 140°C, the conversion is found to be only 20 to 25%.

EXAMPLES 2 TO 23

25 parts of 1-amino-2-phenoxy-4-hydroxyanthraquinone and 90 parts of alcohol A are heated for $x$ hours at $t$ °C in the presence of $b$ parts of additive B and $c$ parts of alkaline reagent C. After working up, M parts of product are obtained. In the comparative experiments the conversion in % is recorded in cases where the conversion is nowhere near quantitative within the stated time. The conversion was determined by thin layer chromatography, through comparisons with mixtures of starting compound and product. The results are summarized in Table 1.

Table 1

| Example | Alcohol A | Additive B | b (parts) | C | c (parts) | Temp. t (°C) | Duration x (hrs) | Yield (parts) | Conversion |
|---|---|---|---|---|---|---|---|---|---|
| 2(a) | Nonaol | PEO M.Wt. 1500 | 5 | Potassium carbonate | 4 | 150 | 15 | 22.5 | |
| (b) | Nonanol | — | 0 | Potassium carbonate | 4 | 150 | 18 | — | 15–20% |
| 3(a) | Lauryl alcohol | PEO M.Wt. 400 | 5 | Potassium carbonate | 4 | 150 | 10 | 27 | |
| (b) | Lauryl alcohol | — | 0 | Potassium carbonate | 4 | 150 | 45 | | ~50% |
| (c) | Lauryl alcohol | DMSO | 5 | Potassium carbonate | 4 | 150 | 45 | | ~50% |
| (d) | Lauryl alcohol | NMP | 5 | Potassium carbonate | 4 | 150 | 45 | 2) | ~98% |
| 4(a) | Stearyl alcohol | PEO M.Wt. 200 | 5 | Potassium carbonate | 4 | 150 | 14 | 27.5 | |
| (b) | Stearyl alcohol | — | 0 | Potassium carbonate | 4 | 150 | 14 | | ~15% |
| 5(a) | 1,3-Butanediol | PEO M.Wt. 4000 | 5 | Potassium carbonate | 4 | 130 | 4 | 17 | |
| (b) | 1,3-Butanediol | — | 0 | Potassium carbonate | 4 | 130 | 6.5 | 17 | |
| 6(a) | 1,4-Butanediol | PEO M.Wt. 200 | 5 | Potassium carbonate | 4 | 110 | 12 | 22 | |
| (b) | 1,4-Butanediol | — | 0 | Potassium carbonate | 4 | 110 | 18 | 21 | |
| 7(a) | 1,5-Pentanediol | PEO M.Wt. 400 | 5 | Potassium carbonate | 4 | 125 | 7 | 24.5 | |
| (b) | 1,5-Pentanediol | — | 0 | Potassium carbonate | 4 | 125 | 35 | | ~90% |
| 8(a) | 3-Methyl-1,3-butanediol | PEO M.Wt. 200 | 5 | Potassium carbamate | 4 | 130 | 4.3 | 23 | |
| (b) | 3-Methyl-1,3-butanediol | — | 0 | Potassium carbonate | 4 | 130 | 18 | 22 | |
| 9(a) | Neopentyl glycol | PEO M.Wt. 600 | 5 | Potassium carbonate | 4 | 150 | 2.5 | 23 | |
| (b) | Neopentyl glycol | — | 0 | Potassium carbonate | 4 | 150 | 4.8 | 22.5 | |
| 10(a) | 1,6-Hexanediol[1] | — | 0 | Potassium carbonate | 4 | 150 | 7 | 22.5 | |
| (b) | 1,6-Hexanediol[1] | PEO M.Wt. 400 | 5 | Potassium carbonate | 4 | 150 | 2 | 23.5 | |
| (c) | 1,6-Hexanediol[1] | PEO M.Wt. 400 | 2.5 | Potassium carbonate | 4 | 150 | 4 | 22.5 | |
| (d) | 1,6-Hexanediol[1] | PEO M.Wt. 400 | 10 | Potassium carbonate | 4 | 150 | 1.5 | 25 | |
| (e) | 1,6-Hexanediol[1] | PEO M.Wt. 400 | 5 | Potassium hydroxide | 4 | 150 | 3 | 25 | |
| (f) | 1,6-Hexanediol[1] | — | 0 | Potassium hydroxide | 4 | 150 | 10 | 23 | |
| (g) | 1,6-Hexanediol[1] | PEO M.Wt. 150 | 5 | Potassium carbonate | 4 | 150 | 2.5 | 23 | |
| 11(a) | 1,6-Hexanediol | PEO M.Wt. 400 | 5 | Potassium carbonate | 4 | 150 | 2 | 23 | |
| (b) | 1,6-Hexanediol | — | 0 | Potassium carbonate | 4 | 150 | 5 | 23 | |
| (c) | 1,6-Hexanediol | — | 0 | Potassium carbonate | 4 | 150 | 6 | 24.5 | |
| 11(d) | 1,6-Hexanediol | PEO M.Wt. 600 | 5 | Potassium carbonate | 4 | 150 | 2 | 24 | |
| (e) | 1,6-Hexanediol | PEO M.Wt. 800 | 5 | Potassium carbonate | 4 | 150 | 2 | 24 | |
| (f) | 1,6-Hexanediol | PEO M.Wt. 400 | 5 | Potassium carbonate | 4 | 150 | 2 | 24 | |
| 12(a) | 1,6-Hexanediol | PEO M.Wt. 400 | 5 | Potassium carbonate | 4 | 115 | 12 | 25 | |
| (b) | 1,6-Hexanediol | — | 0 | Potassium carbonate | 4 | 115 | 30 | | 61% |
| | | | | | | 115 | 60 | | 91% |
| 13(a) | 1,6-Hexanediol | PEO M.Wt. 400 | 5 | Sodium carbonate | 4 | 150 | 33 | | ~95% |
| (b) | 1,6-Hexanediol | — | 0 | Sodium carbonate | 4 | 150 | 33 | | ~60% |
| 14 | Hexanediol | PEO M.Wt. 9000 | 5 | Potassium carbonate | 4 | 150 | 2.3 | 24.5 | |
| 15(a) | Trimethylolpropane | PEO M.Wt. 300 | 7 | Potassium bicarbonate | 4 | 110 | 10.5 | 25.5 | |
| (b) | Trimethylolpropane | — | 0 | Potassium bicarbonate | 4 | 110 | 17 | 23.5 | |
| 16(a) | 2,2,4-Trimethyl-1,3-pentanediol | PEO M.Wt. 300 | 5 | Potassium carbonate | 4 | 130 | 11.5 | 2) | 98–100% |
| (b) | 2,2,4-Trimethyl-1,3-pentanediol | — | 0 | Potassium carbonate | 4 | 130 | 11.5 | | 55% |
| 17(a) | Benzyl alcohol | PEO M.Wt. 200 | 5 | Potassium carbonate | 4 | 120 | 17 | 20 | |
| (b) | Benzyl alcohol | — | 0 | Potassium carbonate | 4 | 1)120 2)140 | 28 11 | 10[2] | |
| 18(a) | β-Phenylethanol | PEO M.Wt. 400 | 5 | Potassium carbonate | 4 | 120 | 15.5 | 23 | |
| (b) | β-Phenylethanol | — | 0 | Potassium carbonate | 4 | 120 | 23 | | 60–65% |
| 19(a) | 5-Methoxy-1-pentanol | PEO M.Wt. 400 | 5 | Potassium carbonate | 4 | 150 | 16 | 13 | |
| (b) | 5-Methoxy-1-pentanol | — | 0 | Potassium carbonate | 4 | 150 | 20 | | 60–65% |
| 20(a) | 6-Methoxyhexanol | PEO M.Wt. 400 | 5 | Potassium carbonate | 4 | 140 | 11 | 11 | |
| (b) | 6-Methoxyhexanol | — | 0 | Potassium carbonate | 4 | 140 | 20 | | 15% |
| 21(a) | 1,4-Dimethylolcyclohexane | PEO M.Wt. 400 | 5 | Potassium carbonate | 4 | 130 | 15 | 25 | |
| (b) | 1,4-Dimethylolcyclohexane | — | 0 | Potassium carbonate | 4 | 130 | 15 | | ~45% |
| 22(a) | 2,3-Diphenyl-1-propanol | PEO M.Wt. 300 | 5 | Potassium carbonate | 4 | 140 | 10 | 12 | |
| (b) | 2,3-Diphenyl-1-propanol | — | 0 | Potassium carbonate | 4 | 140 | 16 | | ~10% |
| 23(a) | ω-Hydroxycaproic acid N-ethylamide | PEO M.Wt. 400 | 5 | Potassium carbonate | 4 | 120 | 9.5 | 13 | |
| 23(b) | ω-Hydroxycaproic acid N-ethylamide | — | 0 | Potassium carbonate | 4 | 120 | 10 | | ~65% |

PEO = polyethylene oxide
M.Wt.: average molecular weight
[1] 1-amino-2-phenoxy-4-hydroxyanthraquinone purified by recrystallization was used.
[2] heavily contaminated with decomposition products.

EXAMPLE 24 a. 12.5 parts of 1-amino-2-phenoxy-4-hydroxyanthraquinone, 13 parts of 3-methyl-1,5-pentanediol, 25 parts of N-methylpyrrolidone, 3 parts of polyethylene oxide of average molecular weight 300 and 2 parts of anhydrous potassium carbonate are stirred for one hour at 150°C under nitrogen. After working up, 10.5 parts of 1-amino-2-(3'-methyl-5'-hydroxypentanoxy)-4-hydroxyanthraquinone are obtained.

b. The procedure under (a) is followed but not polyethylene oxide is added. The mixture is stirred for 3 hours at 150°C. Yield: 9.5 parts of the reaction product.

EXAMPLE 25 a. 13 parts of 1-amino-2-phenoxy-4-hydroxyanthraquinone, 15 parts of γ-phenylpropanol, 20 parts of N-methylpyrrolidone, 3 parts of polyethylene oxide of average molecular weight 600 and 2.5 parts of potassium carbonate are stirred for 3.5 hours at 150°C. After working up, 9 parts of 1-amino-2-(3'-phenylpropoxy)-4-hydroxyanthraquinone are obtained.

b. If the procedure under (a) is followed but no polyethylene oxide is added and 40 parts of N-methylpyrrolidone are used as the solvent, 8.8 parts of reaction product are obtained after 6 hours at 150°C.

EXAMPLE 26 a. 25 parts of 1-amino-2-phenoxy-4-hydroxyanthraquinone, 25 parts of a mixture of 2-methyl-5,5-diphenyl-1-pentanol and 2-ethyl-4,4-diphenyl-1-butanol, 20 parts of N-methylpyrrolidone, 5 parts of polyethylene oxide of average molecular weight 400 and 4 parts of potassium carbonate are heated at 150°C for 10 hours. After working up, 24.5 parts of reaction product are obtained.

b. The procedure under (a) is followed, but no polyethylene oxide is added to the batch. After 20 hours at 150°C, 20 parts of reaction product are isolated.

EXAMPLE 27 a. 30 parts of 1-amino-2-phenoxy-4-hydroxyanthraquinone, 30 parts of 3-methoxy-2,2-dimethyl-1-propanol, 30 parts of dimethylsulfoxide and 3 parts of potassium carbonate are stirred for 13 hours at 150°C under nitrogen. After working up, 20.5 parts of reaction product are obtained.

b. The procedure under (a) is followed, but 3 parts of polyethylene oxide of average molecular weight 200 are added to the reaction mixture. The reaction is complete after only 5 hours at 150°C. Yield: 21.0 parts.

EXAMPLE 28 a. 10 parts of 1-amino-2-phenoxy-4-hydroxyanthraquinone, 25 parts of ω-cyano-1-hexanol, 5 parts of dimethylsulfoxide, 5 parts of a polyethylene oxide of average molecular weight 400 and 1.3 parts of potassium carbonate are heated at 130°C for 3.5 hours. After working up, 9.5 parts of reaction product are obtained.

b. The procedure under (a) is followed, but the reaction is carried out in the absence of polyethylene oxide. After 10 hours at 130°C, 10 parts of the same reaction product are obtained.

EXAMPLE 29 a. 13 parts of 1-amino-2-methoxy-4-hydroxyanthraquinone, 50 parts of 2,2-diethyl-1,3-propanediol, 2.5 parts of a polyethylene oxide of average molecular weight 200 and 1.5 parts of potassium hydroxide are stirred for 2.5 hours at 160°C under nitrogen. After working up, 10 parts of 1-amino-2-(2',2'-diethyl-3'-hydroxypropanoxy)-4-hydroxyanthraquinone are obtained.

b. The procedure under (a) is followed, but in the absence of polyethylene oxide; after 8 hours, 14 parts of reaction product are obtained.

EXAMPLE 30 a. 25 parts of 1-amino-2-phenoxy-4-hydroxyanthraquinone, 90 parts of 2-methyl-2-propyl-1,3-propanediol, 5 parts of a polyethylene oxide of average molecular weight 200 and 4 parts of potassium carbonate are stirred for 13 hours at 130°C under nitrogen. After working up, 21 parts of 1-amino-2-(2'-methyl-2'-propyl-3-hydroxypropanoxy)-4-hydroxyanthraquinone are obtained.

b. The procedure under (a) is followed, but the reaction is carried out in the absence of polyethylene oxide. After 16.5 hours at 130°C, 18 parts of the same reaction product are obtained.

EXAMPLE 31 a. 15 parts of 1-amino-2-phenoxy-4-hydroxyanthraquinone, 15 parts of 4-methoxy-1-butanol, 15 parts of dimethylsulfoxide, 3 parts of a polyethylene oxide of average molecular weight 200 and 1.5 parts of potassium carbonate are stirred for 2 hours at 130 and 0.5 hour at 150°C. After working up, 11 parts of 1-amino-2-(4'-methoxybutanoxy)-4-hydroxyanthraquinone are obtained.

b. The procedure under (a) is followed, but in the absence of polyethylene oxide. After 4 hours at 150°C, 9 parts of the same reaction product are obtained after working up.

EXAMPLE 32 a. 15 parts of 1-amino-2-methoxy-4-hydroxyanthraquinone, 50 parts of 2-ethyl-2-butyl-1,3-propanediol, 2.5 parts of a polyethylene oxide of average moleclar weight 200 and 1.5 parts of potassium hydroxide are heated for 3.5 hours at 160°C under nitrogen. After working up, 13.5 parts of 1-amino-2-(2'-ethyl-2'-butyl-3'-hydroxypropanoxy)-4-hydroxyanthraquinone are obtained.

b. The procedure under (a) is followed, but in the absence of polyethylene oxide. After 8 hours at 160°C, 12.5 parts of the same reaction product are obtained after working up.

EXAMPLE 33 a. 50 parts of 1-amino-2-phenoxy-4-hydroxyanthraquinone, 180 parts of benzyl alcohol, 20 parts of dimethylsulfoxide, 10 parts of a polyethylene oxide of average molecular weight 200 and 8 parts of potassium carbonate are heated at from 125° to 130°C for 5 hours. After working up as in Example 1, 40 parts of 1-amino-2-benzyloxy-4-hydroxyanthraquinone are obtained.

b. The procedure under (a) is followed, but in the absence of polyethylene oxide. After 14 hours at from 125° to 130°C, 32 parts of the same product are obtained after working up.

EXAMPLE 34

27.4 parts of 1-amino-4-hydroxy-2-chloroanthraquinone, 9.4 parts of phenol, 94 parts of 1,6-hexanediol, $(49 - z)$ parts of N-methylpyrrolidone ($z$ = parts of polyethylene oxide) and $y$ parts of alkaline reagent are stirred in the presence of $z$ parts of polyethylene oxide at from 129° to 130°C until the cloroanthraquinone starting material has disappeared. After having cooled to from 80° to 90°C, the reaction mixture is diluted with 90 parts of methanol and the precipitate is filtered off at room temperature and washed with methanol and water until neutral.

thraquinone (melting at from 115° to 116°C) after 9 hours at 130°C and 5 hours at 140°C.

|  | Polyethylene oxide PEO | z (parts) | Alkaline reagent | y (parts) | Time (hours) | Yield (parts) |
|---|---|---|---|---|---|---|
| (a) | — | 0 | potassium carbonate | 12 | 10 | 23 |
| (b) | — | 0 | potassium carbonate | 12 | 9 | 27.5 |
| (c) | — | 0 | potassium bicarbonate | 17.6 | 7 | 27.5 |
| (d) | PEO M.Wt. 400 | 5 | potassium bicarbonate | 17.6 | 4.5 | 26.5 |
| (e) | PEO M.Wt. 400 | 5 | potassium carbonate | 12 | 6.5 | 27 |
| (f) | PEO M.Wt. 400 | 9 | potassium carbonate | 12 | 4.5 | 27.5 |
| (g) | PEO M.Wt. 350 | 5 | potassium carbonate | 12 | 6 | 27 |

EXAMPLE 35 a. 25 parts of 1-amino-2-methoxy-4-hydroxyanthraquinone, 75 parts of 1,6-hexanediol, 4 parts of anhydrous potassium carbonate and 5 parts of a polyethylene oxide of average molecular weight 400 are heated for 5 hours at 150°C under nitrogen. After having cooled to 90°–95°C, the mixture is diluted with 75 parts of methanol and when cold the dye which has precipitated is filtered off. The residue is washed with methanol and water until neutral. Yield: 25.5 parts of 1-amino-2-(6'-hydroxyhexoxy)-4-hydroxyanthraquinone of melting point from 162° to 163°C.

b. The procedure under (a) is followed, but without polyethylene oxide. After 8 hours' reaction, 22.5 parts of the dye is isolated. The product melts at from 155° to 156°C.

EXAMPLE 36 a. A mixture of 25 parts of 3-methyl-1,5-pentanediol, 12 parts of N-methylpyrrolidone, 2.6 parts of phenol and 3.3 parts of potassium carbonate is mixed with 8 parts of 1-amino-4-hydroxy-2-chloroanthraquinone at 130°C and stirred for 3 hours at 130°C and 2 hours at 140°C under nitrogen. After working up, 6 parts of 1-amino-2-(5'-hydroxy-3'-methylpentoxy)-4-hydroxyanthraquinone melting at from 134° to 135°C are obtained.

b. The procedure under (a) is followed, but 2 parts of polyethylene oxide of average molecular weight 300 are added to the batch. After 4 hours at 130°C, 7 parts of the dye, melting at from 137° to 138°C, are obtained.

EXAMPLE 37 a. A mixture of 27.3 parts of 1-amino-4-hydroxy-2-chloroanthraquinone, 90 parts of 2-methyl-2-propyl-1,3-propanediol, 45 parts of N-methylpyrrolidone, 9.4 parts of phenol and 12 parts of potassium carbonate is stirred for 6 hours at 130°C under nitrogen. After dilution with methanol and water and cooling, 15 parts of 1-amino-2-(2'-methyl-2'-propyl-3-hydroxypropoxy)-4-hydroxyanthraquinone melting at from 125° to 126°C (when recrystallized from methanol) are obtained.

b. A mixture of 13.7 parts of 1-amino-4-hydroxy-2-chloroanthraquinone, 45 parts of diol, 22.5 parts of N-methylpyrrolidone, 4.7 parts of phenol, 6 parts of potassium carbonate and 2.5 parts of polyethylene oxide (of average molecular weight 200) gives 14 parts of the dye after 4 hours at 130°C.

EXAMPLE 38 a. Analogously to Example 37(a), 90 parts of 2-ethyl-2-butyl-1,3-propanediol give 27 parts of 1-amino-2-(2'-ethyl-2'-butyl-3'-hydroxypropoxy)-4-hydroxyanthraquinone (melting at from 115° to 116°C) after 9 hours at 130°C and 5 hours at 140°C.

b. The procedure under (a) is followed, but 5 parts of polyethylene oxide (of average molecular weight 400) are added. After 7.5 hours at 130°C, 24 parts of the dye are isolated.

EXAMPLE 39 a. 45 parts of lauryl alcohol, 13 parts of 1-amino-4-hydroxy-2-chloroanthraquinone, 24 parts of N-methylpyrrolidone, 5 parts of phenol and 6 parts of potassium carbonate are reacted for 24 hours at 130°C under nitrogen. After this time, the approximate conversion of the anthraquinone derivative is from 15 to 20%.

b. If the reaction is carried out in the presence of 5 parts of polyethylene oxide (of average molecular weight 600) (added in three portions, namely initially, after 3 hours and after 7 hours), complete conversion takes place in 10.5 hours at 130°C.

Yield: 12.5 parts of 1-amino-2-(n-dodecyloxy)-4-hydroxyanthraquinone.

EXAMPLE 40 a. 45 parts of neopentyl glycol, 13 parts of 1-amino-4-hydroxy-2-chloroanthraquinone, 20 parts of dimethylsulfoxide, 5 parts of phenol and 5 parts of potassium carbonate are reacted for 9 hours at 130°C under nitrogen. Yield: 11 parts of dye.

b. If reaction (a) is carried out in the presence of 3 parts of polyethylene oxide (of average molecular weight 400), 12 parts of dye are obtained after only 5¼ hours at 130°C.

EXAMPLE 41 a. 40 parts of β-phenylethanol, 13 parts of 1-amino-4-hydroxy-2-chloroanthraquinone, 22 parts of dimethylsulfoxide, 5 parts of p-chlorophenol and 8 parts of potassium bicarbonate are heated at 120°C for 22.5 hours. Yield: 12 parts of 1-amino-2-(2'-phenylethoxy)-4-hydroxyanthraquinone.

b. If the procedure under (a) is followed, but 3 parts of polyethylene oxide (of average molecular weight 600) are present, the reaction is complete after only 7¼ hours. Yield: 10 parts of dye.

EXAMPLE 42 a. 47 parts of β-phenylethanol, 13.7 parts of 1-amino-4-hydroxy-2-chloroanthraquinone, 24 parts of dimethylacetamide, 4.7 parts of phenol and 6 parts of potassium carbonate are stirred for 13 hours at 130°C under nitrogen. Yield: 13.5 parts of dye.

b. If the reaction is carried out as under (a), but in the presence of 2.5 parts of polyethylene oxide (of average molecular weight 400), it is complete after 5 hours at 130°C.

Yield: 14.5 parts of dye.

EXAMPLE 43 a. 47 parts of β-phenylethanol, 13.7 parts of 1-amino-4-hydroxy-2-chloroanthraquinone, 24 parts of tetramethylurea, 4.7 parts of phenol and 6 parts of potassium carbonate are heated for 39 hours at 130°C under nitrogen. Yield: 13 parts of dye.

b. If the reaction is carried out as under (a), but in the presence of 2.5 parts of polyethylene oxide (of average molecular weight 400), 12 parts of dye are obtained after 17 hours at 130°C.

EXAMPLE 44 a. 47 parts of β-phenylethanol, 13.7 parts of 1-amino-4-hydroxy-2-chloroanthraquinone, 24 parts of dimethylsulfone, 4.7 parts of phenol and 6 parts of potassium carbonate are heated for 29 hours at 130°C under nitrogen. Yield: 12.5 parts of dye.

b. If the reaction is carried out as under (a), but in the presence of 2.5 parts of polyethylene oxide (of average molecular) weight 400), 13 parts of the dye are obtained in 11.5 hours at 130°C.

EXAMPLE 45 a. 47 parts of β-phenylethanol, 13.7 parts of 1-amino-4-hydroxy-2-chloroanthraquinone, 24 parts of hexamethylphosphoric acid triamide, 4.7 parts of phenol and 6 parts of potassium carbonate are heated at 130°C for 50 hours under nitrogen. The conversion is only about 60%.

b. If the procedure under (a) is followed, but 2.5 parts of polyethylene oxide (of average molecular weight 400) are added, 13 parts of dye are isolated after 14 hours' heating at 130°C.

EXAMPLE 46 a. 47 parts of β-phenylethanol, 13.7 parts of 1-amino-4-hydroxy-2-chloroanthraquinone, 24 parts of polyvinylpyrrolidone, 4.7 parts of phenol and 6 parts of potassium carbonate are heated at 130°C for 12 hours. Yield: 13 parts of dye.

b. If the reaction is carried out as under (a), but in the presence of 2.5 parts of polyethylene oxide (of average molecular weight 400), 13 parts of the dye are obtained after 5 hours.

EXAMPLE 47 a. 90 parts of 1,5-pentanediol, 27.3 parts of 1-amino-4-hydroxy-2-chloroanthraquinone, 45 parts of N-methylpyrrolidone, 10.8 parts of o-cresol and 12 parts of potassium carbonate are heated for 8 hours at 140°C under nitrogen. Yield: 26 parts of 1-amino-2(5'-hydroxypentoxy)-4-hydroxyanthraquinone (melting at from 203° to 204°C.

b. If the procedure under (a) is followed, but 2.5 parts of polyethylene oxide (of average molecular weight 600) are added to the batch, 13 parts of the dye are isolated after 6¼ hours at 130°C.

c. If the procedure under (b) is followed, but at 140°C, 26 parts of the dye are obtained.

EXAMPLE 48 a. 40 parts of β-phenoxyethanol, 13 parts of 1-amino-4-hydroxy-2-chloroanthraquinone, 25 parts of N-methylpyrrolidone, 5 parts of phenol and 5 parts of potassium carbonate are heated for 7.5 hours at 120°C under nitrogen. After this time, the conversion is only about from 50 to 55%.

b. If the procedure under (a) is followed, but 4 parts of polyethylene oxide (of average molecular weight 300) are present, 13.5 parts of the dye are obtained after heating at 120°C for 4 hours.

EXAMPLE 49 a. 90 parts of 2,2,4-trimethyl-1,3-pentanediol, 27.3 parts of 1-amino-4-hydroxy-2-chloroanthraquinone, 45 parts of N-methylpyrrolidone, 9.4 parts of phenol and 12 parts of potassium carbonate are heated for 2 hours at 130°C and 5.5 hours at 140°C under nitrogen. Yield: 22 parts of 1-amino-2-(3-hydroxytrimethylpentoxy)-4-hydroxyanthraquinone melting at from 185° to 186°C.

b. If the procedure under (a) is followed, but the mixture is heated at 140°C for 3 hours in the presence of 5.0 parts of polyethylene oxide (of average molecular weight 600), 23 parts of the dye are obtained.

EXAMPLE 50 a. 45 parts of 2-ethyl-1-hexanol, 13.7 parts of 1-amino-4-hydroxy-2-chloroanthraquinone, 22.7 parts of N-methylpyrrolidone, 4.8 parts of phenol and 6 parts of potassium carbonate are heated for 16.5 hours at 150°C under nitrogen. Yield: 12.5 parts of 1-amino-2-(2'-ethylhexoxy)-4-hydroxyanthraquinone melting at from 108° to 109°C (when recrystallized fron benzene).

b. If the reaction is carried out as under (a), but in the presence of 2.5 parts of polyethylene oxide (of average molecular weight 200), 10 parts of the dye are obtained after 8.5 hours at 150°C.

EXAMPLE 51 a. 90 parts of 2,2-dimethyl-1,3-hexanediol, 27.3 parts of 1-amino-4-hydroxy-2-chloroanthraquinone, 45 parts of N-methylpyrrolidone, 9.4 parts of phenol and 12 parts of potassium carbonate are heated for 5 hours at 130°C and 8 hours at 140°C under nitrogen. When cold, the mixture is diluted with 140 parts of methanol and filtered. The filtrate is diluted with water. 21 parts of 1-amino-2-(2',2'-dimethyl-3'-hydroxyhexoxy)-4-hydroxyanthraquinone are obtained.

b. If the procedure under (a) is followed, but 5.0 parts of polyethylene oxide (of average molecular weight 400) are present, 28 parts of the dye, melting at from 162° to 163°C (when recrystallized from butanol) are obtained after heating for 7 hours at 140°C.

EXAMPLE 52 a. 47 parts of ethylene glycol, 13.7 parts of 1-amino-4-hydroxy-2-chloroanthraquinone, 24 parts of N-methylpyrrolidone, 1.2 parts of phenol and 6 parts of potassium carbonate are heated for 6 hours at 120°–125°C under nitrogen. After working up, 10.5 parts of 1-amino-2-(2'-hydroxyethoxy)-4-hydroxyanthraquinone are obtained.

b. The procedure under (a) is followed, but in the presence of 2.5 parts of polyethylene oxide (of average molecular weight 400). After heating for 3 hours at 120°–125°C, 11.5 parts of the dye are obtained.

EXAMPLE 53 a. 30 parts of 1,1-dimethylolindane, 9.1 parts of 1-amino-4-hydroxy-2-chloroanthraquinone, 16 parts of N-methylpyrrolidone, 3.1 parts of phenol and 4 parts of potassium carbonate are heated for 9.5 hours at 130°–135°C under nitrogen. Yield: 9.5 parts of dye.

b. If the reaction is carried out as under (a), but in the presence of 2 parts of polyethylene glycol (of average molecular weight 400), 10.5 parts of the dye are obtained after heating for 5 hours at 130°–135°C.

EXAMPLE 54 a. 27 parts of 1-amino-4-hydroxy-2-chloroanthraquinone, 20 parts of N-methylpyrrolidone, 10 parts of phenol and 12 parts of potassium carbonate in 150 parts of n-propanol are heated for 15 hours at 130°–135°C in a stirred autoclave. The conversion to 1-amino-4-hydroxy-2-propoxyanthraquinone is about 50%.

b. If the reaction is carried out as under (a), but in the presence of 5 parts of polyethylene oxide (of average molecular weight 400), the conversion to the dye is complete after 15 hours. Yield: 20.5 parts of dye melting at from 196° to 197°C.

I claim:

1. An improvement in the process for the manufacture of 1-amino-2-alkoxy-4-hydroxyanthraquinone by reaction of primary, saturated, linear or branched aliphatic alcohols, which may be substituted by a further 1 or 2 hydroxyl or alkoxy groups, by a phenoxy group, by one or two phenyl groups, by a carboxylic acid amide group or by a nitrile group, with 1-amino-2-phenoxy-4-hydroxyanthraquinone or 1-amino-2-methoxy-4-hydroxyanthraquinone in the presence of alkaline reagents and optionally in the presence of inert solvents at elevated temperatures, which improvement comprises carrying out the reaction in the presence of from 10 to 25% by weight, based on the anthraquinone compound to be converted, of polyethylene glycols of molecular weight 150 or above.

2. A process as set forth in claim 1, wherein polyethylene glycols of molecular weight of from 150 to about 10,000 are used.

3. A process as set forth in claim 1, wherein from 15 to 20 per cent by weight, based on the anthraquinone compound to be converted, of polyethylene glycol are used.

4. A process as set forth in claim 1, wherein the reaction is carried out at temperatures of from 100° to 180°C.

5. A process as set forth in claim 1, wherein 1-amino-2-phenoxy-4-hydroxyanthraquinone is used as the starting compound.

6. A process as set forth in claim 1, wherein sodium hydroxide, potassium hydroxide, sodium bicarbonate, potassium bicarbonate, potassium carbonate, sodium carbonate or mixtures thereof are used as alkaline reagents.

7. A process as set forth in claim 1, wherein 0.8 to 2 equivalents of the alkaline reagent are used per mole of 1-amino-2-phenoxy-4-hydroxyanthraquinone or 1-amino-2-methoxy-4-hydroxyanthraquinone.

8. A process as set forth in claim 1, wherein the amount of primary alcohol used is from 3 to 10 times the amount by weight of the 2-phenoxy-anthraquinone or 2-methoxy-anthraquinone compound.

9. A process as set forth in claim 1, wherein the 1-amino-2-phenoxy-4-hydroxyanthraquinone required for the reaction is produced in situ from 1-amino-2-chloro-4-hydroxyanthraquinone or 1-amino-2-bromo-4-hydroxyanthraquinone and a phenol in the presence of a primary alcohol and of an aprotic polar solvent.

10. A process as set forth in claim 9, wherein N-methylpyrrolidone, dimethylsulfoxide or a mixture thereof is used as the aprotic solvent.

* * * * *